United States Patent
Chu (10) Patent No.: US 7,817,792 B2
(45) Date of Patent: *Oct. 19, 2010

(54) HYPERLINK-BASED SOFTPHONE CALL AND MANAGEMENT

(75) Inventor: Lon-Chan Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 11/533,980

(22) Filed: Sep. 21, 2006

(65) Prior Publication Data

US 2007/0258439 A1    Nov. 8, 2007

Related U.S. Application Data

(60) Provisional application No. 60/746,367, filed on May 4, 2006.

(51) Int. Cl.
*H04M 3/42* (2006.01)
*H04L 12/66* (2006.01)

(52) U.S. Cl. .......... 379/201.01; 379/900; 370/352; 455/411; 455/517; 455/518; 709/205; 709/223; 709/227

(58) Field of Classification Search .......... 370/352; 379/88.01, 144.02; 455/411, 517, 518
See application file for complete search history.

(56) References Cited

U.S. PATENT DOCUMENTS

| | | | |
|---|---|---|---|
| 6,195,679 B1 | 2/2001 | Bauersfeld | |
| 6,337,858 B1* | 1/2002 | Petty et al. | 370/356 |
| 6,433,795 B1 | 8/2002 | MacNaughton | |
| 6,486,891 B1 | 11/2002 | Rice | |
| 6,707,468 B2 | 3/2004 | Tange | |
| 6,707,811 B2* | 3/2004 | Greenberg et al. | 370/352 |
| 6,834,048 B1 | 12/2004 | Cho | |
| 6,834,372 B1 | 12/2004 | Becker | |
| 6,996,072 B1* | 2/2006 | Minborg | 370/352 |
| 7,003,327 B1 | 2/2006 | Payne | |
| 7,106,725 B2* | 9/2006 | Andaker et al. | 370/352 |
| 2002/0002625 A1* | 1/2002 | Vange et al. | 709/246 |
| 2002/0003469 A1 | 1/2002 | Gupta | |

(Continued)

FOREIGN PATENT DOCUMENTS

GB    2354851    4/2001

(Continued)

OTHER PUBLICATIONS

Microsoft Computer Dictionary, Microsoft Press, Fifth Edition, Copyright 2002, pp. 19, 260, 261, 312, 392, 444, 460, 478, & 507, Copyright 2002.*

(Continued)

*Primary Examiner*—William J Deane
*Assistant Examiner*—Khai N Nguyen
(74) *Attorney, Agent, or Firm*—Vierra Magen Marcus & DeNiro LLP (57) ABSTRACT

A hyperlink is added to user interface code to provide a user with an easy way to access various functions of a communication application. The hyperlink can provide target telephone numbers in different formats, specify a web page to be displayed during a call, specify rules to be used to identify a telephone number from a set of telephone numbers, and include commands to manage the communication application.

20 Claims, 6 Drawing Sheets

U.S. PATENT DOCUMENTS

| | | |
|---|---|---|
| 2002/0052747 A1 | 5/2002 | Sarukkai |
| 2002/0064149 A1* | 5/2002 | Elliott et al. ................. 370/352 |
| 2003/0112952 A1* | 6/2003 | Brown et al. ........... 379/211.01 |
| 2003/0198216 A1* | 10/2003 | Lewis ......................... 370/352 |
| 2003/0222901 A1 | 12/2003 | Houck |
| 2003/0233372 A1 | 12/2003 | Warner |
| 2004/0030783 A1 | 2/2004 | Hwang |
| 2004/0039775 A1 | 2/2004 | Yoshida |
| 2004/0122949 A1 | 6/2004 | Zmudzinski |
| 2004/0167895 A1 | 8/2004 | Carro |
| 2004/0243939 A1 | 12/2004 | Perepa |
| 2005/0002510 A1 | 1/2005 | Elsey |
| 2005/0047580 A1 | 3/2005 | Mow |
| 2005/0129193 A1* | 6/2005 | Watts et al. .............. 379/88.17 |
| 2005/0138183 A1 | 6/2005 | O'Rourke |
| 2005/0163311 A1 | 7/2005 | Fowler |
| 2005/0177525 A1 | 8/2005 | Apple |
| 2005/0192948 A1 | 9/2005 | Miller |
| 2005/0226398 A1 | 10/2005 | Bojeun |
| 2005/0232246 A1* | 10/2005 | Dowling ..................... 370/352 |
| 2006/0007915 A1* | 1/2006 | Frame ........................ 370/352 |
| 2006/0031404 A1* | 2/2006 | Kassab ....................... 709/218 |
| 2006/0074760 A1 | 4/2006 | Helin |
| 2006/0117098 A1* | 6/2006 | Dezonno et al. ............ 709/223 |
| 2006/0123082 A1* | 6/2006 | Digate et al. ................ 709/205 |

FOREIGN PATENT DOCUMENTS

| | | | |
|---|---|---|---|
| GB | 2354851 A | * | 4/2001 |
| KR | 20010085120 A | | 9/2001 |
| KR | 20010090668 | | 10/2001 |
| KR | 20010091580 | | 10/2001 |

OTHER PUBLICATIONS

Mosquito, Informatin Society Technologies, Application and Services for the Mobile User and Worker, Mobile Workers' Secure Business Applications in Ubiquitous Environments, Project Acronym, Project Reference 4636, Oct. 2006, Version 1.0, Save Date May 12, 2006, p. 10-11, Paragraph 3.2.3, May 5, 2006.*

VOIP Applications, 2006 Ubiquity Software Corporation PLC, 2 pages, http://www.ubiquitysoftware.com/solutions/sip_applications/voip_apps.php, Submitted on Sep. 21, 2006.

Express Talk VoIP SoftPhone, NCH Swift Sound, May 4, 2006, http://www.nch.com.au/talk/.

Avaya one-X™ Desktop Edition, 2006 Avaya Inc., http://www.avaya.com/master-usa/en-us/resource/assets/factsheet/lb2791.pdf, Submitted on Sep. 21, 2006.

Jung, et al., Annotizer: User-friendly WWW Annotation System for Collaboration in Research and Education Environments, San Francisco State University, http://cs.sfsu.edu/techreports/06/spring/Annotations%20Paper%20(Yoon%20et%20al).pdf, Submitted on Sep. 21, 2006.

Bouvin, et al., Integrating Temporal Media and Open Hypermedia on the World Wide Web, http://www.multimedia.au.dk/~bouvin/www8.pdf, Submitted on Sep. 21, 2006.

Costa-Requena, Service Discovery enabling Ad Hoc networks connectivity, Sep. 2004, http://www.netlab.tkk.fi/julkaisut/tyot/lisurit/Jose_Costa-Requena/LicThesis_final.pdf.

Kuzan, Architecture and Technology for an International Virtual Lecture Theatre, Sep. 21, 2003, http://www.ifi.unizh.ch/egov/dipl_kuzan_final.pdf.

European Search Report dated Oct. 26, 2009, European Application No. 07755644.7.

International Search Report and Written Opinion of the International Searching Authority dated Sep. 19, 2007, in PCT Application No. PCT/US2004009451.

* cited by examiner

HYPERLINK-BASED SOFTPHONE CALL AND MANAGEMENT

CLAIM OF PRIORITY

This application claims the benefit of U.S. Provisional Application 60/746,367, "SoftPhone With Simplified Calling," filed on May 4, 2006, by Lon-Chan Chu, Pitak Leelaphisut and Praveen Kumar Vemparala, incorporated herein by reference in its entirety.

BACKGROUND

Voice over Internet Protocol (VOIP) is a technology that allows users to make telephone calls using a broadband Internet connection instead of a traditional telephone line. Some services using VOIP may only allow users to call other people who are also using VOIP. However, many services also allow users to call anyone who has a telephone number—including local, long distance, mobile, and international numbers. While some services only work over a computer or a special VOIP phone, other services allow use of a traditional telephone through an adaptor.

To encourage the use of VOIP, technology providers have sought ways to make VOIP more convenient and efficient to use. One attempt to encourage the use of VOIP includes the use of hyperlinks. Developers of VOIP applications have implemented technology that allows providers of content to include hyperlinks in the content. Users can initiate telephone calls by executing (e.g., selecting) the hyperlink. However, the use of these hyperlinks has been limited. For example, some hyperlinks only provide the user with the ability to initiate a telephone call to a preset telephone number.

Even with the hyperlinks, the user typically will still need to perform manual steps for many administrative functions. Additionally, some telephone numbers may only be valid during certain time periods. Outside the time periods, the hyperlink will not be useful because the target telephone number is not valid.

SUMMARY

The technology described herein facilitates the use of a communication application with the introduction of a new hyperlink.

A hyperlink is added to user interface code to provide a user with an easy way to access various functions of a communication application. The hyperlink can provide target telephone numbers in different formats, specify a web page (or other content) to be displayed during a call, specify rules to be used to identify a telephone number from a set of telephone numbers, and include commands to manage the communication application.

One embodiment includes receiving a selection of a link in a first interface, establishing a voice connection based on the link, accessing content over a network based on the link, and presenting the content while the voice connection is operational. Another embodiment includes receiving information from a link selected in a first interface, accessing a command in the information, and executing the command using a voice communication application. Another embodiment includes receiving a selection of a link in a first interface, accessing a rule referenced in the link, choosing a communication target based on evaluating the rule, and establishing communication with the target using a communication interface.

The technology described herein can be implemented using hardware, software, or a combination of both hardware and software. The software used is stored on one or more processor readable storage devices including hard disk drives, CD-ROMs, DVDs, optical disks, floppy disks, tape drives, RAM, ROM, flash memory, or other suitable storage devices. This software can be used to program one or more processors to perform the functions described herein. In alternative embodiments, some or all of the software can be replaced by dedicated hardware including custom integrated circuits, gate arrays, FPGAs, PLDs, and special purpose computers. An exemplar apparatus that can perform the functions described herein includes one or more processors in communication with a storage device and a communication interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technology described herein facilitates the use of a communication application with a hyperlink. One or more of the hyperlinks are added to user interface code to provide a user with an easy way to access various functions of a communication application. The hyperlink can provide target telephone numbers in different formats, specify a web page to be displayed during a call, specify rules to be used to identify a telephone number from a set of telephone numbers, and include commands to manage the communication application. For example, an advertisement in a web page may include a hyperlink to initiate a telephone call to a store and to cause the user's browser to simultaneously navigate to the web page for that store.

Figure 1:
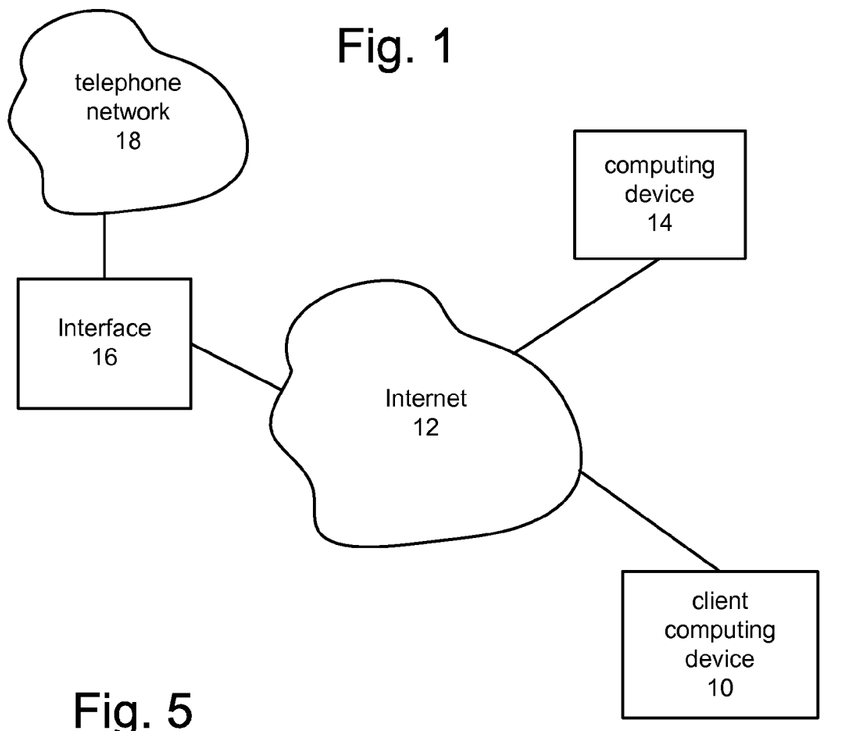
FIG. 1 is a block diagram of one embodiment of a system that provides for voice communication over a network.

FIG. 1 is a block diagram depicting one embodiment of a system that provides for communication over a network using the hyperlink described herein. In one example implementation, the communication is established using VOIP technology. FIG. 1 depicts client computing device 10 in communication with Internet 12. Client computing device 10 can be any suitable computing device including a personal computer, notebook computer, handheld device, mobile telephone, etc. Client computing device 10 includes software and/or hardware to allow communication over Internet 12.

For example, client computing device may include a VOIP software application that communicates over a network interface.

FIG. 1 also shows computing device 14 and interface 16 in communication with Internet 12. Interface 16 is also in communication with telephone network 18 via a direct communication link, Internet 12 or another means. Computing device 14 can be any type of computing device that can communicate with other computing devices. Telephone network 18 is the well known legacy telephone network and/or a cellular telephone network. Interface 16 includes hardware that provides an interface between the legacy telephone network 18 and the data network of Internet 12. For example, interface 16 can be one or more computers that receive VOIP communication via Internet 12 and transfer those communications to legacy telephone network 18, as well as transfer voice communication from telephone network 18 to VOIP communication over Internet 12. It is contemplated that a user of client computing device 10 will make a telephone call using VOIP technology to another user on computing device 14, to a user of a conventional or wireless telephone on telephone network 18. In other embodiments, the user making the telephone call can be using a telephone with an adaptor rather than client computing device 10.

Figure 2:
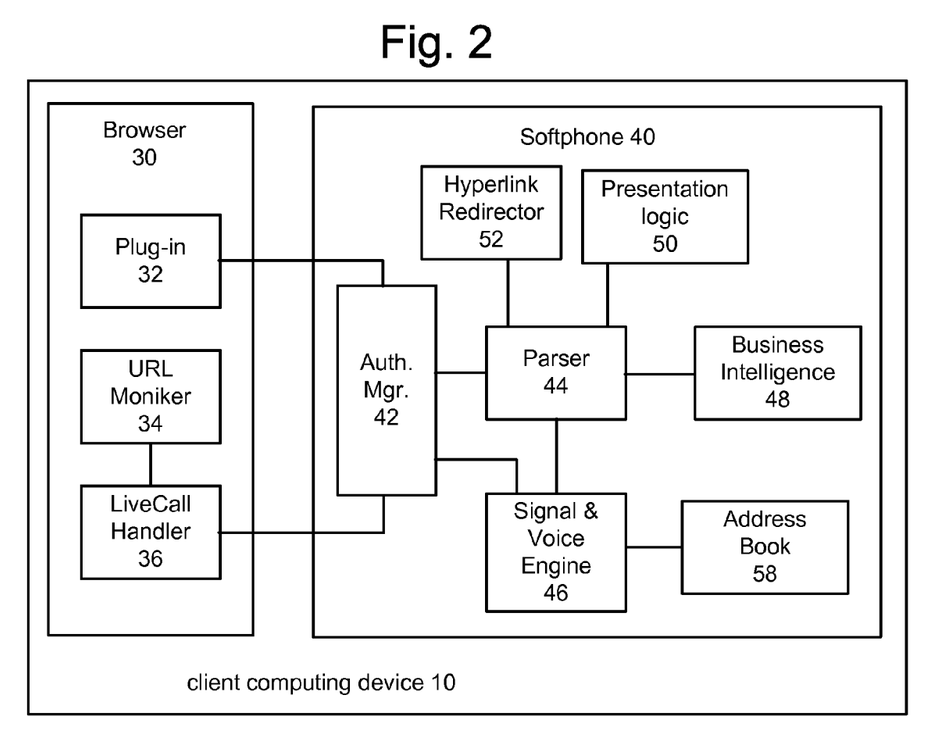
FIG. 2 is a block diagram of one embodiment of the components on a client device.

FIG. 2 is a block diagram depicting various components residing on client computing device 10. In one embodiment, client computing device 10 includes Browser 30 (e.g., Internet Explorer from Microsoft Corporation, or another browser) and SoftPhone 40. In one embodiment, SoftPhone 40 is a software application that can implement VOIP. In other embodiments, SoftPhone 40 will implement other communication protocols that can be used to establish a voice connection or other type of connection that includes a voice communication. SoftPhone 40 can be part of a communication application that includes instant messaging, email, file sharing and other services.

Browser 30 includes plug-in 32, URL Moniker 34 and LiveCall Handler 36. Plug-in 32 is a software module that is loaded by and running in the browser. When a web page is loaded, a browser calls a browser plug-in to perform a function. When a user hovers on a text string, Browser 30 calls browser plug-in 32 to process the text string. URL Moniker 34 receives URLs that are in code implementing a user interface within Browser 30 and looks up the appropriate protocol handler for these URLs. LiveCall Handler 36 is one example of a protocol handler. As discussed above, one aspect of the technology described herein is a new hyperlink. This hyperlink is referred to as a LiveCall hyperlink. LiveCall Handler 36 is the protocol handler for the LiveCall hyperlink.

SoftPhone 40 includes Authentication Manager 42, which is a software module that authenticates users prior to using SoftPhone 40. In some embodiments, Authentication Manager 42 also verifies that a user is authorized to perform the actions requested by the user. FIG. 2 shows Authentication Manager 42 in communication with plug-in 32 and LiveCall Handler 36.

After a user is authenticated, Authentication Manager 42 will pass control to parser 44 or another module. Parser 44 is a software module that parses a URL into various components. Parser 44 will communicate these components to Signal and Voice Engine 46, Business Intelligence 48, Presentation Logic 50 and Hyperlink Redirector 52.

Signal and Voice Engine 46, which is also in communication with Authentication Manager 42, provides the engine for initiating and maintaining a VOIP telephone call. Signal and Voice Engine 46 is in communication with Address Book 58. In one embodiment, Address Book 58 stores contact information for various people associated with the user. Address Book 58 can be part of a personal information management application or a data store that is dedicated to SoftPhone 40.

Business Intelligence 48 is a data store which stores information about the use of SoftPhone 40 for Business Intelligence applications. Presentation Logic 50 provides a user interface for SoftPhone 40. Hyperlink Redirector 52 can be used to redirect either Presentation Logic 50 or Browser 30 based on a command or information in a URL. In one embodiment, Hyperlink Redirector 52 is in communication with Browser 30.

Figure 3:
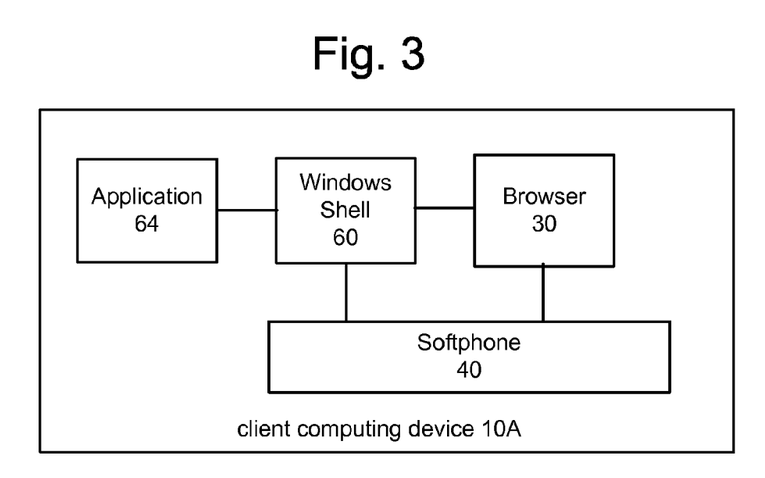
FIG. 3 is a block diagram of one embodiment of the components on a client device.

FIG. 2 contemplates the environment where the hyperlink is used in code for a web page displayed in Browser 30 and the user is using SoftPhone 40 to make a VOIP call via Internet 12 or other network. In another embodiment depicted in FIG. 3, the hyperlink can be used within an application other than a browser. For example, a hyperlink can be used in a word processing document, spreadsheet, or any other application. FIG. 3 shows client computing device 10A including SoftPhone 40, Browser 30, Windows Shell 60, and Application 64. SoftPhone 40 and Browser 30 include the components depicted in FIG. 2. Windows Shell 60 is an interface for the operating system.

Figure 4:
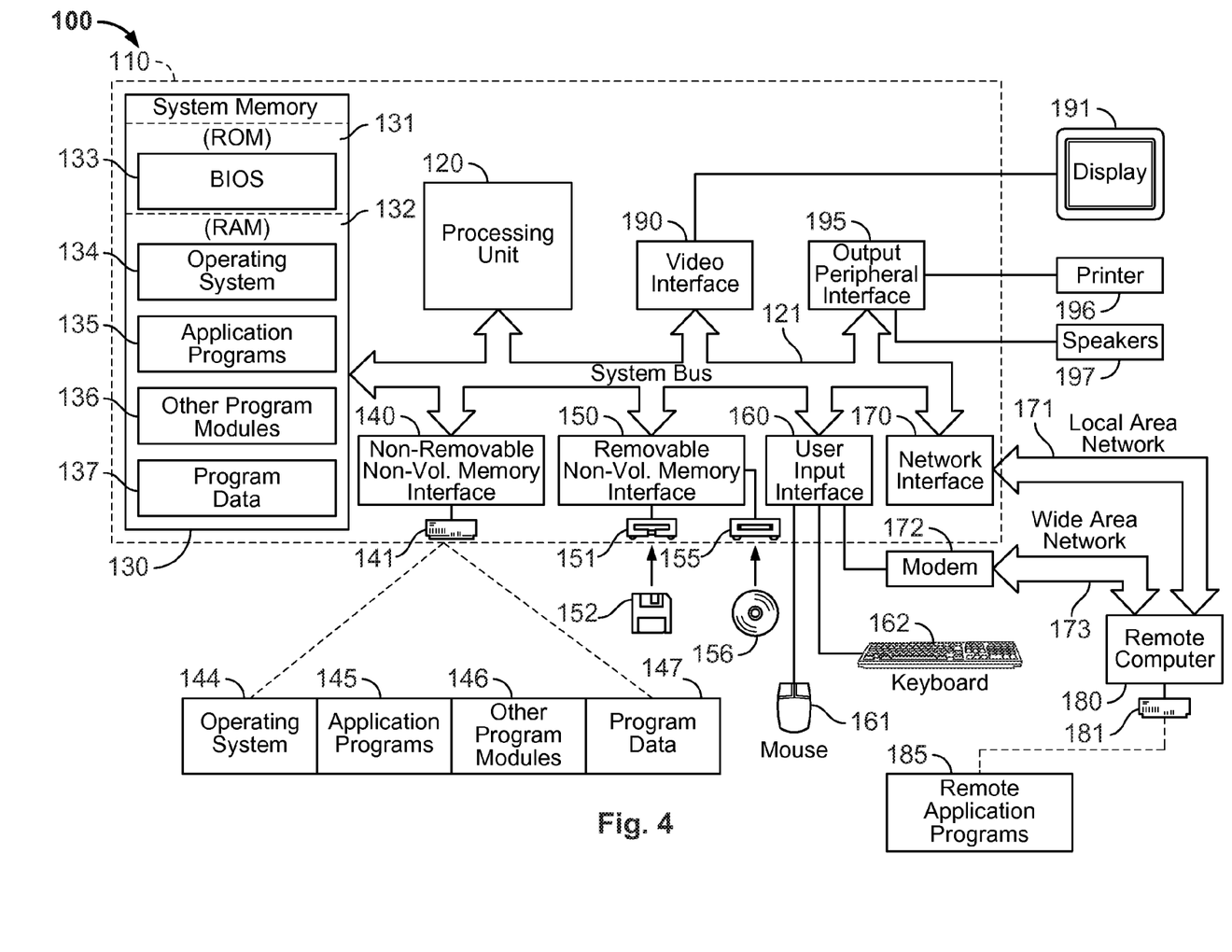
FIG. 4 is a block diagram describing one embodiment of a computing system.

FIG. 4 illustrates one example of a suitable general computing environment 100 that may be used to implement the various components illustrated in FIGS. 1-3. For example, computing system 100 can be used to implement user client computing device 10, computing device 14, or interface 16. Computing system 100 is only one example of a suitable computing environment and is not intended to suggest any limitation as to the scope of use or functionality of the technology described herein. Neither should computing system 100 be interpreted as having any dependency or requirement relating to any one or combination of components illustrated in the exemplary operating environment 100.

The technologies described herein are operational with numerous general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 4, an exemplary system includes a general purpose computing device in the form of computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data. By way of example, and not limitation, communication media includes wired media such as a wired network or direct-wired connection. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data to program the processor(s) to perform the methods described herein. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

The technology described herein makes use of a new hyperlink—the LiveCall hyperlink. The LiveCall hyperlink allows an application developer to specify an extensible address for placing a VOIP call from a web page or application. The types of calls include: PC-to-Phone call and a PC-to-PC call. The PC-to-Phone call originates from a PC and terminates at a telephone, including a fixed line telephone or a mobile phone. The PC-to-PC call includes voice, video and optional text chat. This call originates from a PC and also terminates at a PC. The types of target addresses in a LiveCall hyperlink include a telephone number, a contact (e.g., a contact in an address book), a computer name (e.g., JohnDoe PC) or an IP address (e.g., 124.38.110.25).

The syntax for a LiveCall hyperlink is: LiveCall:<Parameters>. To make a call to a telephone number, the following parameters can be used:
  Phone: a phone number that can be local, domestic long distance, or international number
  Local: a local phone number
  National: a domestic long distance number
  Direct: a direct dialing, i.e. raw digits
  Contact: a contact in presence or address book
  Some examples include:
(1) LiveCall:+14257069606; Place a PC-to-Phone call using the telephone number +14257069606.
(2) LiveCall:Phone=7069606; Place a PC-to-Phone call using the telephone number 7069606, which can be a local phone number, domestic phone number, or an international phone number. SoftPhone 40 will parse this telephone number based on its location settings.
(3) LiveCall:Phone=PIZZAUSA; Place a PC-to-Phone call using the telephone number 74992872 (PIZZAUSA).
(4) LiveCall:Local=7069606; Place a PC-to-Phone call using the local phone number 7069606.
(5) LiveCall:National=14257069606; Place a PC-to-Phone call using a domestic long-distance telephone number 14257069606.
(6) LiveCall:Direct=911; Place a PC-to-Phone call using the digits as it is.
(7) LiveCall:Contact=JohnDoe@hotmail.com; Place a PC-to-Phone call using the default phone number in the contact information (or address book) for John Doe.

To make a call to a computer, the following parameters can be used: (1) Online: an online presence ID; and (2) Host: a computer name or an IP address. Some examples include:
(1) LiveCall:Online=JohnDoe@hotmail.com; Place a PC-to-PC call using the online presence ID.
(2) LiveCall:Host=JohnDoePC; Place a PC-to-PC call using the computer name of the destination machine.
(3) LiveCall:Host=124.38.110.25; Place a PC-to-PC call using the IP address of the destination machine.

The LiveCall hyperlink can be used to execute a command. The command in LiveCall will be prefixed with a question mark '?' The following are examples of commands:

(1) LiveCall:?CallNow; Show the SoftPhone ready to make a call.
(2) LiveCall:?ResumeCall; Resume the current call interrupted for any reason,
(3) LiveCall:?TestCall; Make a free test call to test the connectivity and voice quality.
(4) LiveCall:?Troubleshoot; Start the troubleshooting wizard for the SoftPhone issues.
(5) LiveCall:?Help; Show the help page.
(6) LiveCall:?Tuning; Start the audio tuning wizard for the SoftPhone.
(7) LiveCall:?Signup; Go to the signup web site to start signup process.
(8) LiveCall:?Account; Go and automatically sign in to the OAM (online account management) web site to manage the account.
(9) LiveCall:?Balance; Go and automatically sign in to the OAM web site to view the current balance in the account.
(10) LiveCall:?AddBalance; Go and automatically sign in to the OAM web site to add the balance in the account.
(11) LiveCall:?BillingHistory; Go and automatically sign in to the OAM web site to view the billing history.
(12) LiveCall:?Options; Show the options (or settings) dialog of the SoftPhone.
(13) LiveCall:?CallHistory; Go and automatically sign in to the OAM web site to view the call history.
(14) LiveCall:?LocalCallHistory; Show the local call history that lists recent calls made from this machine.
(15) LiveCall:?Contacts; Show the contact list where the user can make a call from.
(16) LiveCall:?EmergencyInfo; Go and automatically sign in to the OAM web site to show/edit the user's emergency information.
(17) LiveCall:?ServiceStatus; Go and automatically sign in to the service status site where the user can see the current status of this service including any outage.
(18) LiveCall:?ServiceAddress; Go and automatically sign in to the OAM web site to show/edit the user's service address.

The table below shows the components that are used for the various commands:

| Command | Auth Mgr 42 | Parser 44 | Signal & Voice Engine 46 | Addr. Book 58 | Present. Logic 50 | Hyperlink Redirector 52 | Bus. Intell. 48 |
|---|---|---|---|---|---|---|---|
| Phone Call | ✓ | ✓ | ✓ | ✓ | | ✓ | ✓ |
| PC Call | ✓ | ✓ | ✓ | ✓ | | ✓ | ✓ |
| CallNow | ✓ | ✓ | | | ✓ | | ✓ |
| ResumeCall | ✓ | ✓ | | | ✓ | | ✓ |
| TestCall | ✓ | ✓ | | | ✓ | | ✓ |
| Troubleshoot | ✓ | ✓ | | | ✓ | | ✓ |
| Help | ✓ | ✓ | | | ✓ | | ✓ |
| Tuning | ✓ | ✓ | | | ✓ | | ✓ |
| Options | ✓ | ✓ | | | ✓ | | ✓ |
| LocalCallHist | ✓ | ✓ | | | ✓ | | ✓ |
| Contacts | ✓ | ✓ | | | ✓ | | ✓ |
| Signup | ✓ | ✓ | | | | ✓ | ✓ |
| Account | ✓ | ✓ | | | | ✓ | ✓ |
| Balance | ✓ | ✓ | | | | ✓ | ✓ |
| AddBalance | ✓ | ✓ | | | | ✓ | ✓ |
| BillingHistory | ✓ | ✓ | | | | ✓ | ✓ |
| CallHistory | ✓ | ✓ | | | | ✓ | ✓ |
| EmergencyInf | ✓ | ✓ | | | | ✓ | ✓ |
| ServiceStatus | ✓ | ✓ | | | | ✓ | ✓ |
| ServiceAddr | ✓ | ✓ | | | | ✓ | ✓ |

The source parameter "Src" in a LiveCall hyperlink indicates the source context where this LiveCall hyperlink is clicked or executed. This information is useful for business intelligence. The source parameter can be combined with other parameters. Parameters in a LiveCall hyperlink are concatenated by the '&' sign. Consider the following examples:

(1) LiveCall:Phone=7069606&Src=Messenger/Contact/Home; Place a PC-to-Phone call using the home phone number listed in the contacts of Messenger (Instant Messaging).

(2) LiveCall:Online=JohnDoe@hotmail.com&Src=Messenger/Buddy; Place a PC-to-PC call using the online presence ID listed in the buddy list of Messenger.

(3) LiveCall:?Signup&Src=Hotmail/Ads; Go to the signup web site to start signup process, where this hyperlink is listed in the ads section of Hotmail (web based email service).

One feature of the LiveCall hyperlink is to make a telephone call and browse a designated web site at the same time. This may be important, for example, for commercial calls to allow the customer to view the order information online. Consider the following examples:

(1) LiveCall:Phone=7069606&Src=YellowPage/Pizza&URL=http://www.bestpizza.com; Place a PC-to-Phone call using the pizza store phone number listed in the yellow pages (e.g., a web site implementing a yellow pages directory). At the same time, the user can browse to the web site at http://www.bestpizza.com.

(2) LiveCall:+886229212154&URL=http://www.flowerdelivery.com.tw; Place a PC-to-Phone call using an international phone number to order a flower delivery in Taiwan. At the same time, the user can browse to the flower delivery web site at http://www.flowerdelivery.com.tw to view the selection and price.

The LiveCall hyperlink allows for calling rules that select a telephone number based on the calling rule. The syntax of the rule is either a sequential list of telephone numbers or a condition with two lists of phone numbers:

---

Rule={ <sequential list of phone numbers separated by a comma> }
Rule={ <condition, either true or false> }?{ < list of phone numbers in true condition> }:{ < list of phone numbers in false condition> }

---

Consider the following examples:

(1) LiveCall:Contact=JohnDoe@hotmail.com&Rule={home,work,mobile,pc}; Place a PC-to-Phone call using the phone numbers listed in the contact information (or address book) associated with the contact having an email address of JohnDoe@hotmail.com, but the order of the numbers to call is home number first, work number second, mobile number the third, and finally making a PC-to-PC call as the last resort. That is, if the target is not reached using the home number, try the work number; and if the target is not reached using the work number then try the mobile number; and if the target is not reached using the mobile number then try the PC.

(2) LiveCall:Contact=JohnDoe@hotmail.com&Rule={time>8:00 am&time<5:00 pm}? {work,mobile}: {home,mobile}; Place a PC-to-Phone call using the phone numbers listed in the contact information (or address book) associated with the contact having an email address of JohnDoe@hotmail.com, but the order of the numbers to call depends on the time of the day. At work hours (from 8 am to 5 pm), the order is work number first and then mobile number. At other times, the order is home number first and then mobile number.

Figure 5:
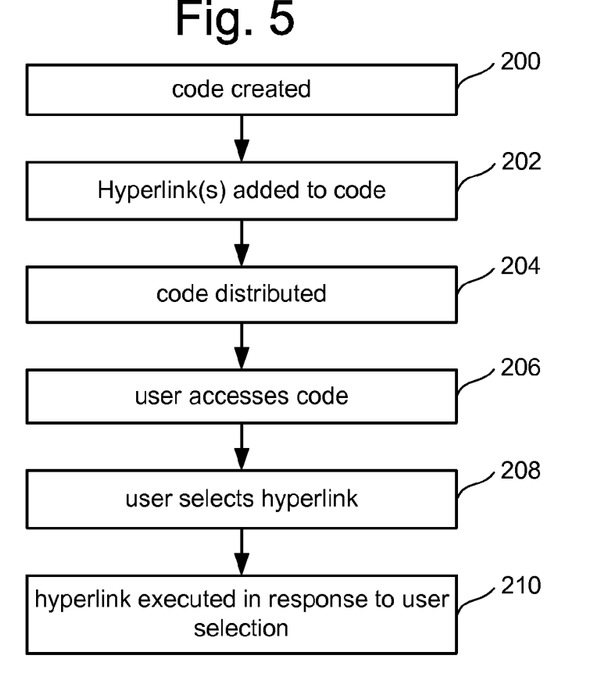
FIG. 5 is a flowchart describing one embodiment of a process for using hyperlinks with a communication system.

FIG. 5 is a high level flowchart describing one embodiment of a process for using the LiveCall hyperlinks. In step 200, code for a web page or other interface is created. In step 202, one or more LiveCall hyperlinks are added to the code. In step 204, the code is distributed. In one embodiment, the code can be distributed via Internet 12 when users navigate to an appropriate web site. In other embodiments, the code is part of an application that is distributed through the Internet, retail stores or other means. In step 206, a user accesses the code. For example, a user may navigate to a web site or launch an application. In step 208, the user selects a LiveCall hyperlink. For example, a web site may include an advertisement for a certain good, where the advertisement indicates that if the user clicks on the hyperlink the user will call the store who sells that good. Other examples are also relevant. In response to selecting the LiveCall hyperlink, the hyperlink is executed in step 210.

Figure 6:
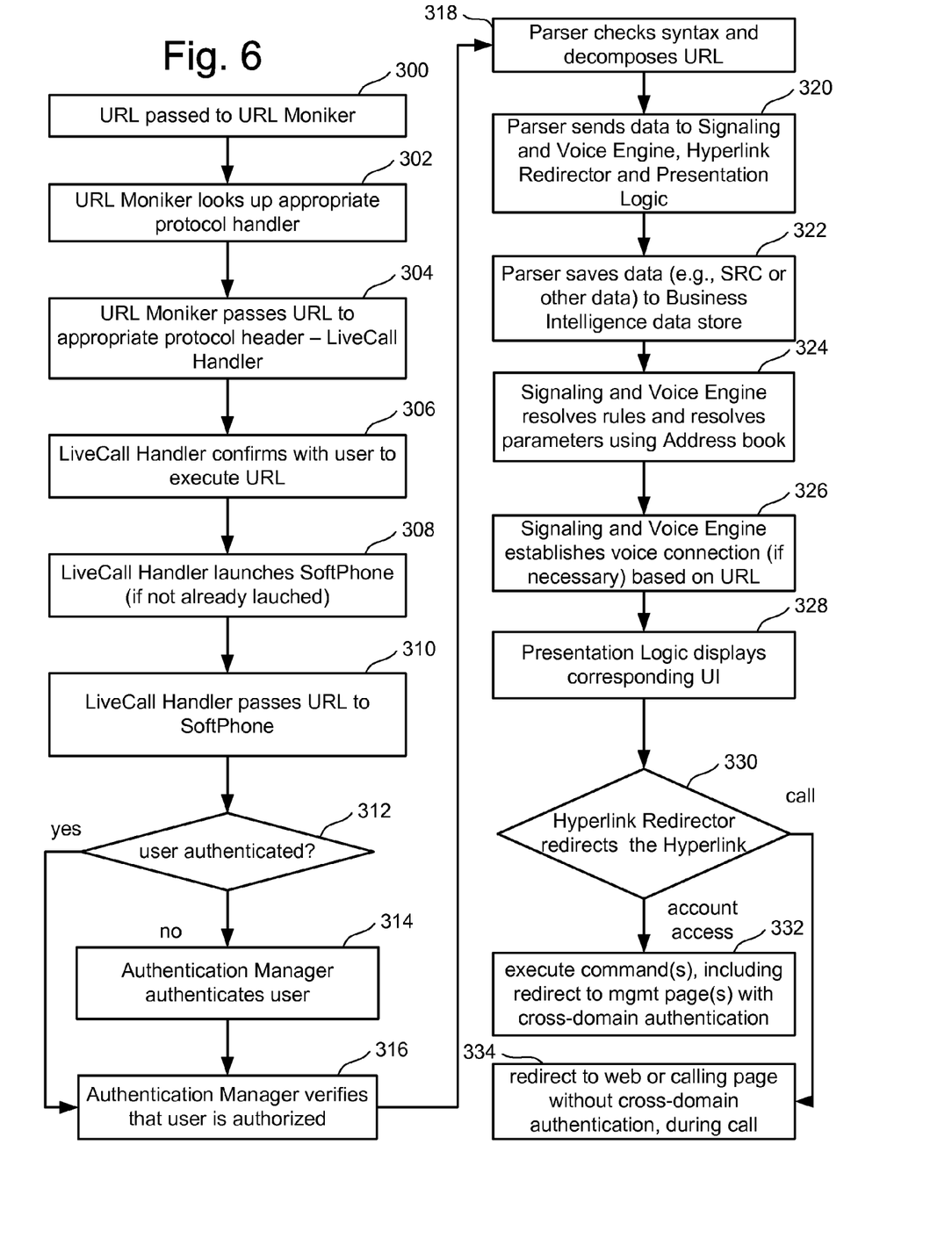
FIG. 6 is a flowchart describing one embodiment of a process performed by a communication system in response to a hyperlink.

FIG. 6 is a flowchart describing one embodiment of a process performed in response to a user clicking on or otherwise selecting a LiveCall hyperlink in a web page, document, file or user interface (see step 210 of FIG. 5). A hyperlink is typically expresses as a Uniform Resource Locator (URL). In step 300, the URL of the selected LiveCall hyperlink is passed to URL Moniker 34. In step 302, URL Moniker 34 looks up the appropriate protocol handler based on the header information in the URL (e.g., "LiveCall:"). In step 304, the URL Moniker 34 passes the URL to the appropriate protocol handler. In the case of the LiveCall hyperlink, the URL is passed to LiveCall Handler 36. In step 306, LiveCall handler 36 confirms with the user that the user wants to execute the URL. In some embodiments, step 306 is optional and can be skipped. In step 308, LiveCall Handler 36 launches SoftPhone 40. In some embodiments, if SoftPhone 40 is already running, then it does not need to be launched again. SoftPhone 40 includes a graphical user interface that comprises a keypad for dialing, a telephone number display area, an area that displays call history, an area that displays service provider information, an area that displays telephone call information, and (optionally) an area to display web or network content.

In step 310, LiveCall Handler 36 will pass the URL to SoftPhone 40. In one embodiment, the URL is initially passed to Authentication Manager 42. If the user is not authenticated (step 312), then Authentication Manager 42 will authenticate the user. In one embodiment, this will include providing a log-in screen where the user can provide a username and password. If the user does not properly authenticate, the process of FIG. 6 will terminate. After authenticating the user, Authentication Manager 42 will verify whether the user is authorized to perform the function identified in the hyperlink in step 316. Note that if the user was previously authenticated (see step 312), then step 314 will be skipped and the process will proceed to step 316 to determine whether the user is authorized.

In step 318, the URL representing the hyperlink (e.g., "LiveCall:Contact=JohnDoe@hotmail.com&Rule={time>8:00 am&time<5.00 pm}? {work,mobile}:{home,mobile};") will be passed to parser 44 which will check the syntax of the URL and decompose the URL into various components. In step 320, parser 44 will send the appropriate components to Signaling and Voice Engine 46, Business Presentation Logic 50 and Hyperlink Redirector 52. In one embodiment, the command, callee and calling rule will be passed to Signal and Voice Engine 46, the command will be passed to Presentation Logic 50, and the command and hyperlink will be passed to Hyperlink Redirector 52. In step 322, parser 44 will save the data (e.g. all of the components) to Business Intelligence data store 48. In step 324, Signaling and Voice Engine 46 will resolve any rules and resolve any parameters using the Address Book 58. For example, if a target is identified by a contact or computer name, Address Book 58 will be used to translate that contact to a telephone number or translate the computer name to a IP address. As an additional example, if a rule tests whether the time of a call is within a predetermined range then Signaling and Voice Engine 46 will test whether the current system time is within that predetermined range and select the appropriate telephone number (see example above).

In step 326, Signaling and Voice Engine 46 will establish a voice connection (if the hyperlink includes a command for a voice connection to be established) based on the URL. In step 328, Presentation Logic 50 will display a corresponding interface for the command in the hyperlink. In step 330, the Hyperlink Redirector 52 will redirect according to the hyperlink. If the command in the hyperlink is to access or otherwise manage an account, then in step 332 Hyperlink Redirector 52 redirects the user to a particular management page within the user interface for SoftPhone 40 or Browser 30, and the command is executed. This redirection may include a cross domain authentication. That is, if the user is already authenticated via SoftPhone 40, then the user will not need to authenticate a second time. In one example, a cross domain authentication credential is created and that credential will be provided to the management application or management page so that the user will be authenticated and will not need to type in another password. In step 330, if the command in the hyperlink is to make a telephone call, Hyperlink Redirector 52 will redirect the hyperlink without any cross domain authentication credential (step 334).

The hyperlink can include a telephone number and a web site address. Hyperlink Redirector 52 will cause Browser 30 to show the target web site associated with the address included in the hyperlink. This web site will be provided to the user during the telephone call (e.g., step 334) via the browser or the user interface for the SoftPhone. In some embodiments, the web site will be loaded concurrently with the establishment of the telephone call or shortly thereafter.

Figure 7:
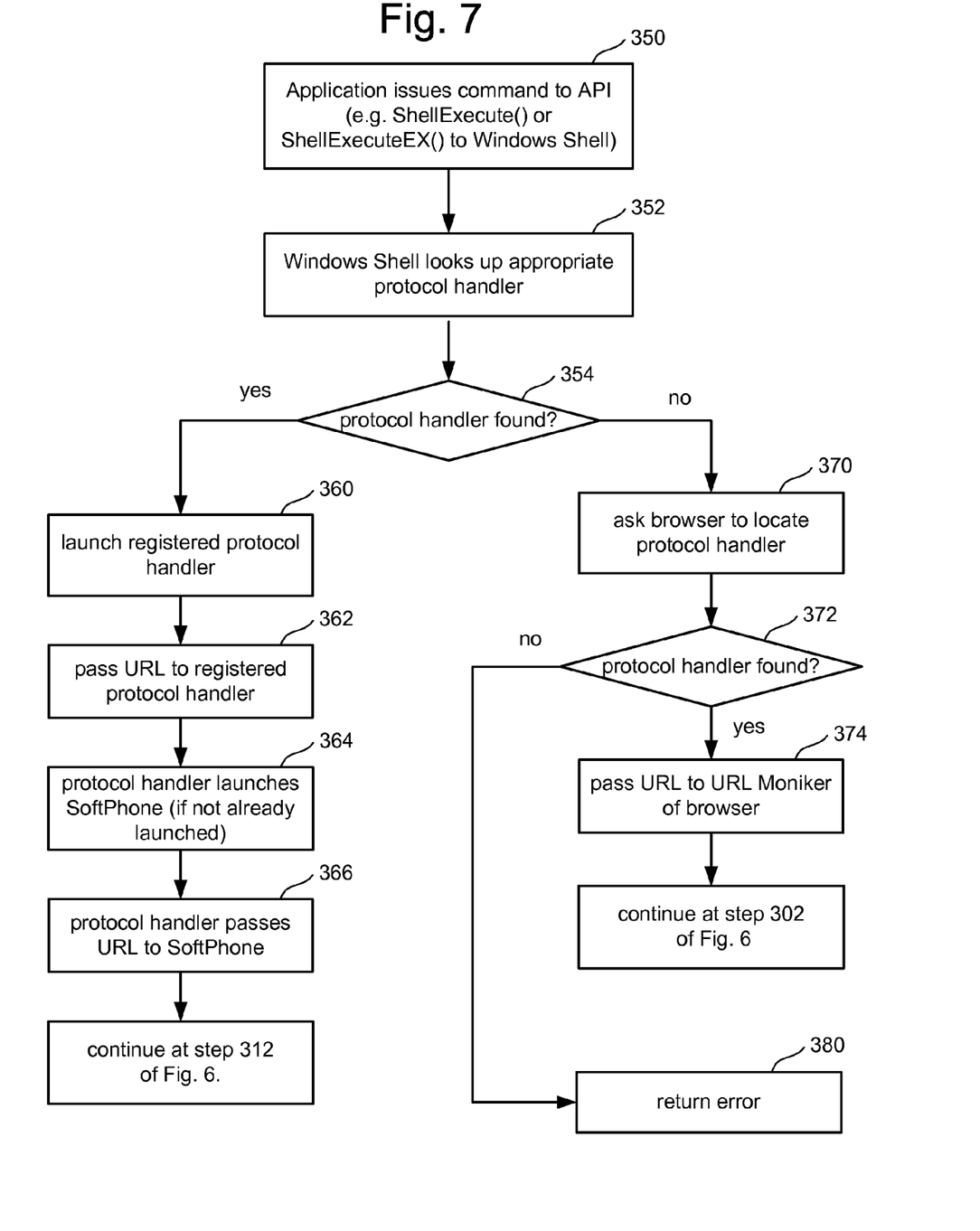
FIG. 7 is a flowchart describing one embodiment of a process performed by a communication system in response to a hyperlink.

FIG. 7 is a flowchart describing one embodiment of a process performed in response to a LiveCall hyperlink being selected when operating within the embodiment of FIG. 3. That is, a hyperlink is in an application. In step 350, application 64 issues a command to an API. For example, a ShellExecute( ) or ShellExecuteEX( ) is issued to Window Shell 60. In step 352, Windows Shell 60 will look up the appropriate protocol handler. If the protocol handler is found (step 354), then Windows Shell 60 will launch the Protocol Handler in step 360. For example, LiveCall Handler 36 can be launched. The Protocol Handler can exist separate from Browser 30 or as part of Browser 30.

Prior to operation, a LiveCall protocol handler needs to be registered. Two implementations are possible for registering a protocol handler. One is to register the protocol handler with Windows Shell. The other is to register the protocol handler with the browser. One advantage of registering the protocol handler with the browser is that the protocol handler can perform a sanity check to insure that the user has a chance to confirm the execution of the URL before the application is actually launched. This may be important to protect a user from drive-by executions of the URL while the user is visiting a web site.

In step 362, the URL is passed to the protocol handler. In step 364, the protocol handler launches SoftPhone 40, if not already launched. In step 366, the protocol handler passes the URL to SoftPhone 40. After step 366 the process will continue at step 312 of FIG. 6.

If the Windows Shell 68 did not find an appropriate protocol handler (step 354), then Windows Shell 60 will ask Browser 30 to locate the appropriate protocol handler in step 370. If Browser 30 is able to find the appropriate protocol handler, then it will pass the URL to URL Moniker 34 in step 374. In step 376, that process will continue in step 302 of FIG. 6. If no appropriate protocol handler was found in step 372, an error is returned to step 380.

Figure 8:
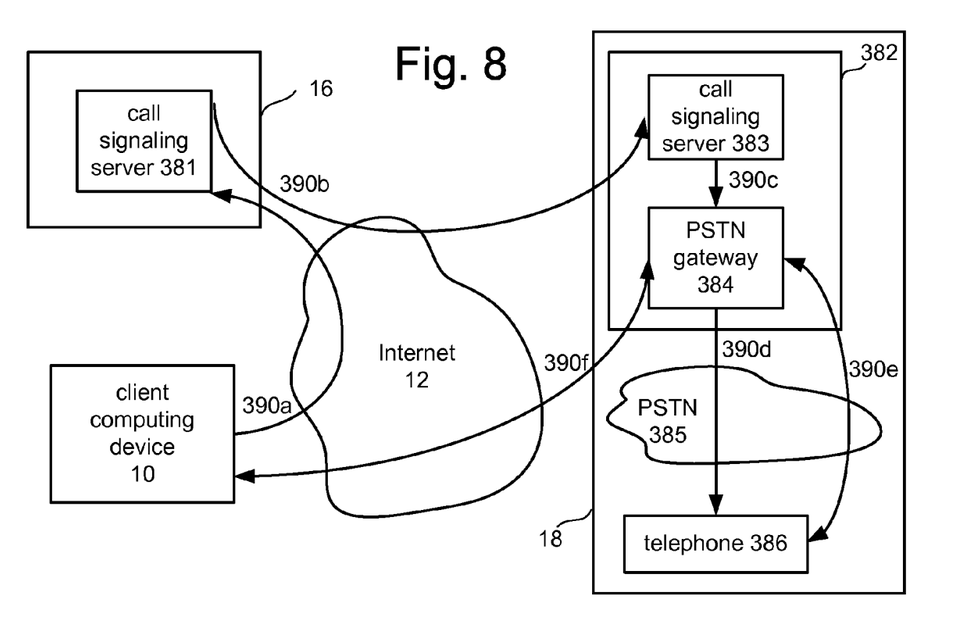
FIG. 8 is a block diagram depicting one example of implementing a PC-to-Phone call.

FIG. 8 is a block diagram depicting one example of implementing a PC-to-Phone call by a LiveCall hyperlink (e.g., LiveCall:+14257069606). FIG. 8 depicts Client computing device 10 in communication (via Internet 12) with a call signaling server 381 of interface 16, which itself is in communication with a call signaling server 383 of a Telco provider 382 via Internet 12. Signaling server 383 is in communication with Public Switched Telephone Network ("PSTN") gateway 384 of Telco provider 382. PSTN gateway 384 is in communication with client computing device 10 via Internet 12 and with telephone 386 via PSTN 385.

SoftPhone 40 in client computing device 10 sends a call signaling message (including the phone number specified in the LiveCall hyperlink) to the call signaling server 381 (see 390*a*). Call signaling server 381 authenticates the user and routes the call signaling message to the appropriate telco provider 382 (see 390*b*). When the call signaling server 383 at the telco provider 382 receives the call signaling message, it authorizes the call and terminates the call to the appropriate PSTN Gateway 384 (see 390*c*). The PSTN Gateway routes the call to the destination telephone line (see 390*d*). When a user picks up the telephone 386 at the destination telephone line, the voice stream will be established among SoftPhone 40 (in client device 10), PSTN gateway 384, and PSTN telephone 386 (see 390*e* and 390*f*). During the telephone call, SoftPhone 40 can access and display web content or cause the browser to access and display web content.

Telephone 386 can be PSTN telephone or mobile/cellular phone. In the case of a mobile/cellular phone, PSTN gateway, PSTN network, and PSTN telephone can be replaced with mobile gateway, mobile network, and mobile phone, respectively. In another embodiment, the PSTN telephone can be replaced with mobile gateway, mobile network, and mobile phone. In one implementation, SIP (Session Initiation Protocol) is used for call signaling.

Figure 9:
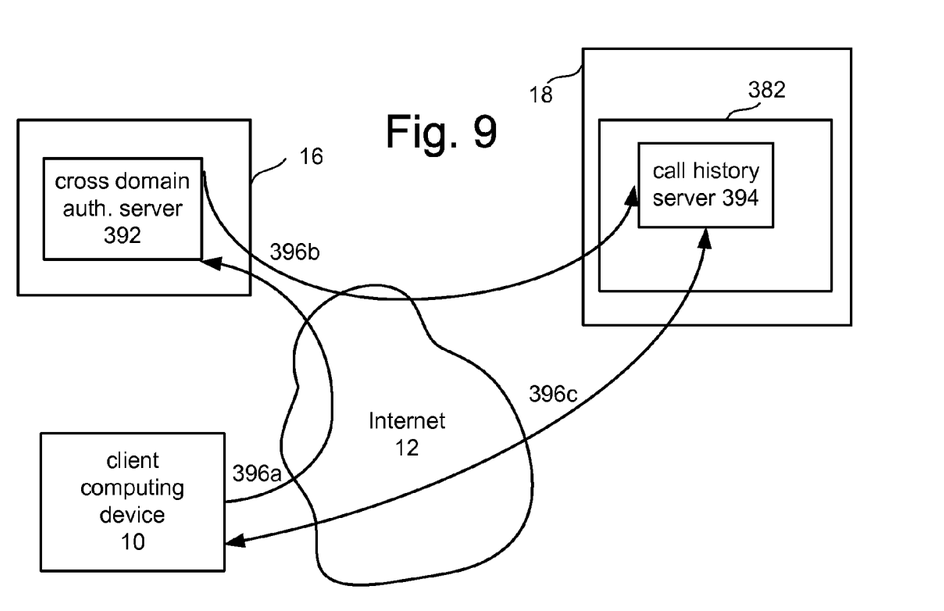
FIG. 9 is a block diagram depicting one example of implementing a command.

FIG. 9 is a block diagram depicting one example of implementing a command to access the call history (e.g., using a LiveCall hyperlink "LiveCall:?CallHistory"). FIG. 9 depicts Client computing device 10 in communication (via Internet 12) with a cross domain authentication server 392 of interface 16, which itself is in communication with a call history server 394 of Telco provider 382 via Internet 12. Call history server 394 is in communication with client 10 via Internet 12.

SoftPhone 40, on client 10, launches the browser to process the internal call history URL. The browser on client 10 sends the internal call history URL to the cross-domain authentication server 392 (see 396*a*). Cross-domain authentication server 392 authenticates the call history URL and forwards the call history URL to the appropriate telco provider (see 396*b*). When the call history web server 394 at the telco data center 382 receives the call history URL, it starts the call history query process and displays the call history landing page. From now on, the browser on client 10 can directly communicate with the call history web server 394 for call records. (see 396c).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

I claim:

1. A machine implemented method for communicating, comprising:
    receiving a selection of a hyperlink in a first interface associated with a device, said hyperlink is in a first web page, said device is coupled to a network;
    receiving said hyperlink at a parser in a voice communication application on said device;
    parsing said hyperlink by said parser;
    providing a first set of information in said hyperlink from said parser to a redirector in said voice communication application;
    providing a second set of information in said hyperlink from said parser to a voice engine for establishing said voice connection;
    establishing a voice over Internet Protocol (VOIP) connection between said device and a target node based on second information in said hyperlink, said establishing is performed automatically by said voice communication application in response to said selection of said hyperlink;
    redirecting said interface to a second web page over said network based on said first information in said hyperlink, said redirecting is performed automatically by said voice communication application in response to said selection of said hyperlink, said first information in said hyperlink identifies said second web page;
    communicating, by said device, voice data over said VOIP connection; and
    presenting said second web page on said device while said device communicates voice data over said VOIP connection.

2. A machine implemented method according to claim 1, wherein said hyperlink identifies a destination for said voice over Internet Protocol connection.

3. A machine implemented method according to claim 1, wherein:
    said hyperlink includes a rule; and
    said step of establishing a voice connection includes choosing a communication target based on evaluating said rule and establishing voice communication between said device and said target.

4. A machine implemented method according to claim 1, wherein:
    said hyperlink includes a command;
    said method further includes executing said command using said voice communication application; and
    said step of establishing said voice connection is performed by said voice communication application.

5. A machine implemented method according to claim 1, wherein:
    said selection of said hyperlink is received by a network browser that is running on said device.

6. A machine implemented method according to claim 1, wherein:
    said selection of said hyperlink is received by an application other than a network browser.

7. A machine implemented method according to claim 1, wherein:
    said hyperlink includes a designation of a source context where said hyperlink is executed; and
    said method further includes storing said designation in a business intelligence data store in response to receiving said selection of said hyperlink.

8. A machine implemented method according to claim 1, further comprising:
    identifying a protocol handler associated with said hyperlink based on header information in said link;
    passing said hyperlink to said protocol handler; and
    using said protocol handler to activate said voice communication application, said voice communication application performs said establishing said voice connection.

9. A machine implemented method according to claim 1, further comprising:
    redirecting to a different domain using a cross-domain credential to avoid having a user sign-in an additional time, said redirecting is based on said first set of information.

10. A machine implemented method according to claim 1, further comprising:
    issuing an API command from an application to a shell for an operating system in response to said receiving said selection of said hyperlink in said first interface, said first interface is part of said application;
    identifying a protocol handler associated with said hyperlink using said shell;
    launching said protocol handler; and
    using said protocol handler to activate said voice communication application, said voice communication application performs said establishing said voice connection.

11. A machine implemented method according to claim 1, further comprising:
    issuing an API command from an application on said device to a shell for an operating system on said device in response to said receiving said selection of said hyperlink in said first interface, said first interface is part of said application;
    sending a request from said shell to a browser on said device asking said browser to identify a protocol handler associated with said hyperlink;
    identifying a protocol handler using said browser;
    launching said protocol handler; and
    using said protocol handler to activate said voice communication application on said device, said voice communication application performs said establishing said voice connection.

12. A computing device, comprising:
    a storage device, said storage device stores code;
    a display;
    a voice communication interface; and
    one or more processors in communication with said storage device, said display, and said voice communication interface;
    said code which when executed on said one or more processors causes said computing device to receive a selection of a hyperlink in said display, said code causes said computing device to access a rule included in said hyperlink, said rule identifies one or more conditions and a plurality of ordered lists of voice communication targets, said code causes said computing device to access data for evaluating the one or more conditions, said code causes said computing device to evaluate the one or more conditions based on the data, said code causes said computing device to select one of the ordered lists based on evaluating the one or more conditions, said code causes said computing device to attempt to establish voice communication with the targets in the order in the selected list, said code causes said computing device to receive voice data from a first of the voice communication targets for which said voice communication was established, said code causes said computing device to present said voice data in said voice communication interface.

13. A computing device according to claim 12, wherein:
a first of the conditions is based on a first time period and a second of the conditions is based on a second time period;
said first time period is associated with a first telephone number; and
said second time period is associated with a second telephone number.

14. A computing device according to claim 12, wherein:
said rule includes a designation of an address book entry, said address book entry includes a plurality of telephone numbers, said code causes said computing device to attempt to establish voice communication with the targets by selecting from among the plurality of telephone numbers based on evaluating said one or more conditions.

15. One or more processor readable storage devices having code embodied on said processor readable storage devices, said code for programming said one or more processors to implement:
a voice communication application that comprises a parser, a hyperlink redirector, an authentication manager, and a voice engine;
said authentication manager receives a hyperlink that was selected in an interface of a device and verifies that a user is authenticated;
said parser receives said hyperlink and parses said selected hyperlink into a plurality of components based on a syntax of said selected hyperlink, said syntax allows said selected hyperlink to specify information for establishing a voice call and to specify a plurality of types of commands, said plurality of types of commands include a first type of command for establishing a voice communication and a second type of command for performing an action other than establishing a voice communication;
said parser extracts from said selected hyperlink, based on said syntax, information for establishing a voice call and said first type of command, said information include a target and passes said extracted information to said voice engine if said hyperlink includes said first type of command, said voice engine uses said extracted information to establish said voice call between said device and said target;
said parser extracts said second type of command from said selected hyperlink based on said syntax, said parser passes said second type of command to said hyperlink redirector, said hyperlink redirector redirects said interface to a web site based on said second type of command, said hyperlink redirector redirects said interface to a web site associated with said voice call while said voice call is established if said second type of command is to make a voice call, said hyperlink redirector redirects said interface to an online account management web site if said second type of command is to access an account, said device sends a request to a cross domain authentication server such that the user does not need to authenticate a second time if said second type of command is to access said account.

16. One or more processor readable storage devices according to claim 15, wherein:
said parser extracts a rule from said selected hyperlink and passes said extracted rule to said voice engine, said voice engine selects a telephone number based on said extracted rule and establishes said voice call to said selected telephone number.

17. One or more processor readable storage devices according to claim 15, wherein said second type of command allows an action that includes accessing said online account management web site to allow one or more of: viewing a balance for said account, adding to said balance for said account, viewing a billing history for said account, and viewing a calling history for said account.

18. One or more processor readable storage devices according to claim 15, wherein the voice communication application further comprises an address book, said information for establishing a voice call includes one or more rules and one or more parameters, said voice engine resolves said one or more rules and said one or more parameters using said address book in order to establish said voice call.

19. A machine implemented method according to claim 3, wherein said rule includes an ordered list of communication targets, said step of establishing a voice connection includes attempting to establish communication with the communication targets on the ordered list based on the order on the list.

20. A machine implemented method according to claim 9, wherein said redirecting to a different domain using a cross-domain credential includes sending a request to a cross domain authentication server based on said first set of information.

* * * * *